Jan. 13, 1948.　　　G. S. BOYLAN　　　2,434,345
CONVEYING MECHANISM
Filed Nov. 1, 1944　　　4 Sheets-Sheet 3
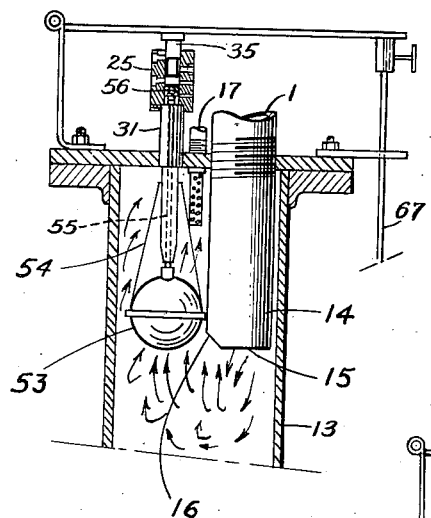
Fig. 4
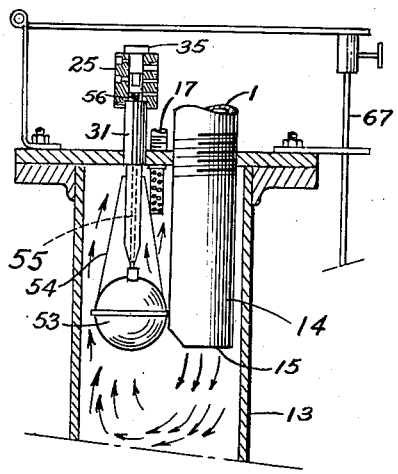
Fig. 5
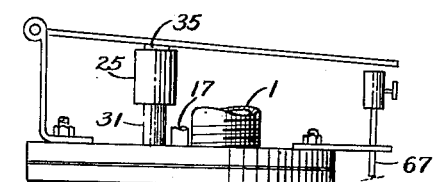
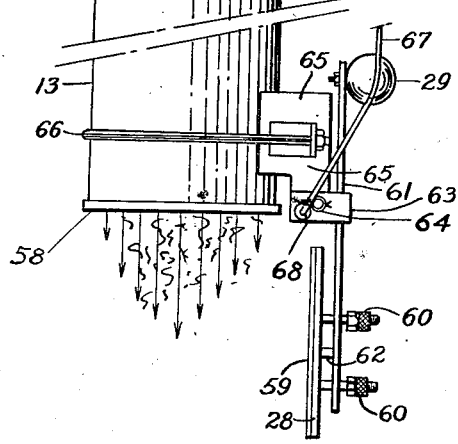
Fig. 6
INVENTOR.
GOVE S. BOYLAN
BY
Pennie, Davis, Marvin & Edmonds

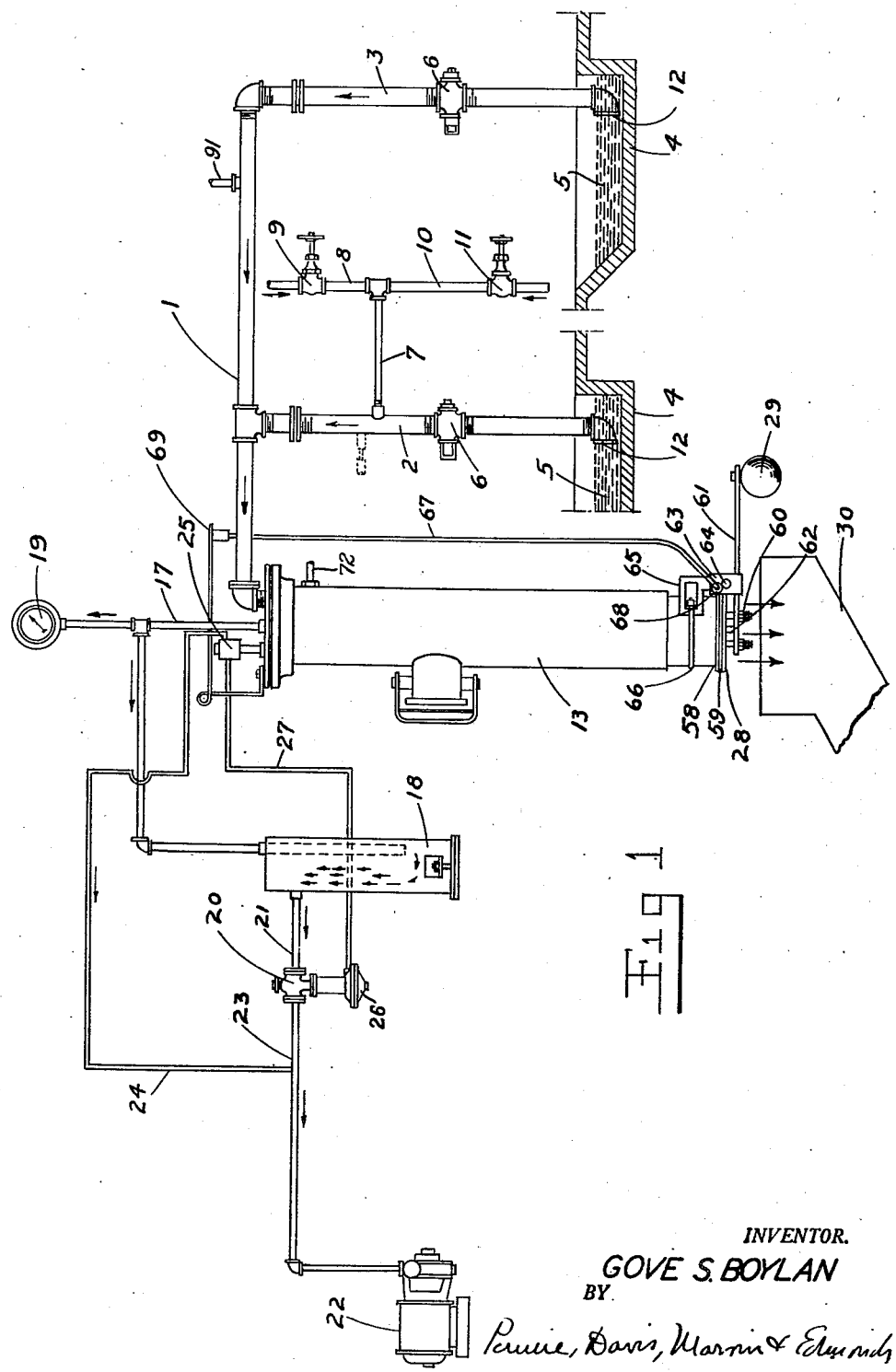

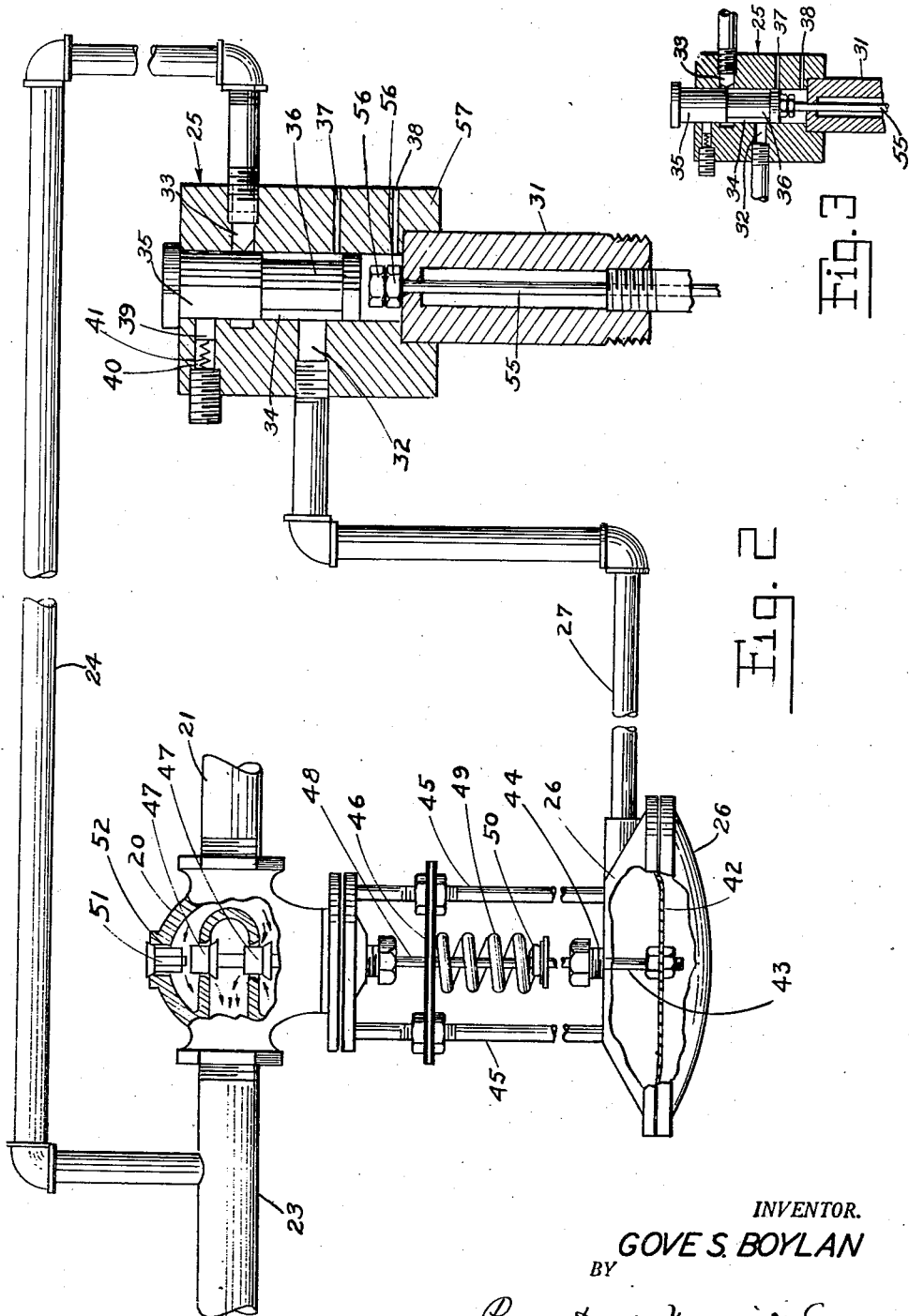

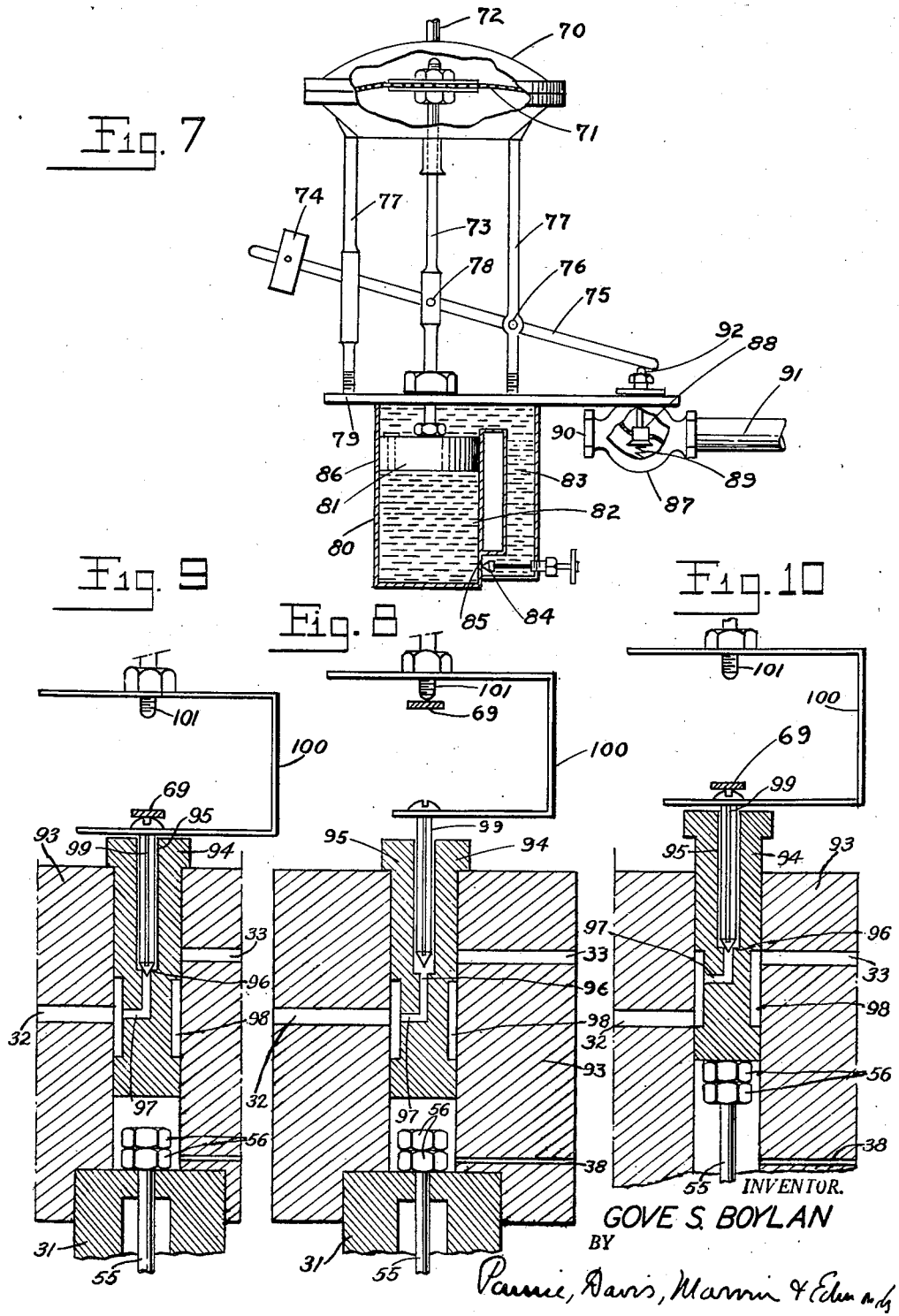

Patented Jan. 13, 1948

2,434,345

UNITED STATES PATENT OFFICE 2,434,345

CONVEYING MECHANISM

Gove Saylor Boylan, Ridgway, Pa., assignor to United States Leather Company, New York, N. Y., a corporation of New Jersey Application November 1, 1944, Serial No. 562,942

10 Claims. (Cl. 302—59)

This invention relates to conveying systems and more particularly to a vacuum controlled conveying system in which granular, liquid or semi-solid material is collected and conveyed to a receptacle from which it may be discharged into a storage bin or car.

While the system may be capable of various uses, it is designed primarily for the conveying of material, such as hide fleshings and trimmings, removed from animal hides in a tanning process. The following description will, therefore, be directed to such use of the apparatus and system as an illustration, but the invention is not so limited and may be used successfully in conveying any materials which may be floated in air or a combination of water and air as the carrier medium.

The nature of hide fleshings is such that the conveying of such material in an ordinary chain or other conventional conveyor is an unsatisfactory method and the physical construction of such conveyors limits their application in existing plants and controls the lay-out of new installations to narrow limits.

In the present invention I have provided a conveying means which lends itself to easy application to existing plant lay-outs for conveying material and which permits the location of the storage bin at the most advantageous point with respect to car loading or unloading, available space and other considerations, such as favorable storage conditions. In carrying out the invention I provide a receiver in which the material is to be collected, and connected thereto I provide a pipe or plurality of pipes through which the material is conveyed from suitable troughs or other sources. During filling of the receiver, a vacuum is maintained in the system to cause the material in the troughs to be fed through the collecting pipes to the receiver. I further provide a valve in the vacuum line connected in turn to a pilot valve on the receiver and the pilot valve is actuated when a predetermined amount of material has been collected in the receiver to disconnect the receiver from the vacuum source through the main valve. The receiver is then adapted to automatically discharge its contents into a storage bin or car and reset the pilot valve to again actuate the main valve and re-establish the vacuum in the system.

In the accompanying drawings I have illustrated several forms of the invention. In this showing:

Fig. 1 is a diagrammatic view of the complete lay-out;

Fig. 2 is an enlarged, sectional view of the main vacuum valve and the pilot valve showing the position of the parts in normal filling operation;

Fig. 3 is a similar view showing the position of the parts immediately prior to and during the discharging operation;

Fig. 4 is a detailed, sectional view of the upper end of the receiver showing the position of the pilot valve and its actuating mechanism preliminary to discharge;

Fig. 5 is a similar view of the parts during normal filling operation;

Fig. 6 is a detailed view of the receiver with the bottom or discharge outlet in open position;

Fig. 7 is a detailed view of an auxiliary valve, one or more of which may be connected in the system at various points; and Figs. 8, 9 and 10 are detailed views of a modified construction of pilot valve showing the valve in different positions during the cycle of operation.

Referring to Fig. 1 of the drawings, the system includes a main collecting pipe or tube 1 which may be provided with any number of branches 2 and 3, the lower ends of which are received in troughs 4 containing the material 5 to be collected. Each of the branch pipes is provided with a valve 6 so that any number of them can be shut off when not in use. Each pipe may also be provided with a branch 7 connected to a pipe 8 through which high pressure steam may be delivered to the system and this pipe is provided with a valve 9. The pipe 7 may also be connected to a pipe 10 leading to the atmosphere and having a valve 11 arranged therein. In normal operation the valves 9 and 11 are closed. When the system is used as a fleshing conveyor, the ends of the pipes 2 and 3, which extend into the troughs, are preferably arranged with their faces 12 in a vertical plane.

The receiver 13 may be of any suitable size and shape and is shown as a cylindrical tank. The main conveying pipe 1 enters the top of the receiver and extends downwardly therein as indicated at 14 (see Figs. 4 and 5). The discharge opening in the pipe 14 extends partially across the bottom normal to the axis of the pipe as indicated at 15 and the inner side is cut away as shown at 16. The opening is preferably formed in this shape to properly convey the discharged material for actuating the pilot valve whereby the vacuum connection to the tank is broken, as will be more fully hereinafter described.

A vacuum pipe 17 is connected to the top of the receiver and extends to an auxiliary separator 18. The pipe 17 may be provided with a branch having a suitable vacuum gauge 19 thereon. The auxiliary receiver 18 is in turn connected to a main vacuum valve 20 by a pipe 21 and the opposite side of the main valve casing is connected to a suitable vacuum pump 22 by a pipe 23. On the pump side of the main valve, pipe 23 is provided with a branch 24 connected to a pilot valve casing 25 arranged on top of the receiver. The pilot valve casing 25 is connected to diaphragm chamber 26 of main valve 20 by connection 27 (see Figs. 2 and 3).

The lower end of the receiver 13 is provided with a door 28 which is gravity controlled and is adapted to automatically open to discharge the contents of the receiver when the connection between the receiver and the vacuum pump is broken. The door is provided with a suitable counter-weight 29 to close it after the material in the receiver has been discharged and the weight removed from the door 28. The receiver communicates with a tube or chute 30 (see Fig. 1) by means of which the discharged material is conveyed to a fleshing storage bin or to a railway car (not shown).

The means for maintaining and releasing the vacuum in the system is shown in detail in Figs. 2 to 5, Figs. 2 and 3 illustrating the main vacuum valve and the pilot valve arranged on the receiver, and Figs. 4 and 5 illustrating the mechanism within the tank by means of which the pilot valve is actuated. As shown (see Figs. 2 and 3) the pilot valve casing 25 is provided with a pipe or tube 31 at its lower end which may be received in an opening in the top of the receiver. The valve casing is provided with a transverse port 32 on one side to which the pipe 27 is connected; and on the opposite side, and out of alignment with the port 32, it is provided with a lateral port 33 to which the pipe 24 is connected. The ports 32 and 33 communicate with a central bore 34 in the valve casing which receives a valve member 35. Intermediate its ends the valve member is provided with a portion 36 of reduced diameter. On the side of the valve casing with the port 33, there are provided additional ports 37 and 38. The valve member 35 is frictionally retained in its various positions by a member 39 which is arranged in a suitable passage 40 and retained in snug engagement with the valve by means of a spring 41.

As stated, Fig. 2 illustrates the position of the pilot valve during the normal filling operation. In this portion of the cycle the valve member 35 is in such position that the vacuum connection through port 33 is disconnected from pipe 27, and the diaphragm chamber 26 of the main valve is connected to the atmosphere through pipe 27, port 32, the main bore 34 of pilot valve casing and port 37. When the pilot valve is raised from the position shown in Fig. 2 of the drawings to the position shown in Fig. 3 of the drawings, port 37 is disconnected from the diaphragm chamber 26, the reduced portion 36 of the pilot valve having moved out of alignment with this port, and the port 33 is connected to the diaphragm chamber by being brought into register with the reduced portion 36 of the valve. This places the diaphragm chamber in communication with the vacuum source to actuate the main valve. Port 38 is provided to equalize the pressure in the valve chamber by connecting the bottom portion of the valve chamber to the atmosphere.

Control of the vacuum connection to the main vacuum valve is effected by a diaphragm 42 arranged in the diaphragm chamber 26 and having a rod 43 connected thereto which passes through a suitable guide 44 in the diaphragm chamber. The diaphragm chamber is connected to the valve casing 20 by a plurality of rods 45 and a plate 46 is supported on these rods. Within the valve chamber 20 a double valve 47 is provided engaging suitable valve seats and this valve member is provided with a stem 48 which is an extension of rod 43 and which extends into the valve casing through an opening in the plate 46. A spring 49 surrounds the valve stem between the plate 46 and the end of the valve stem, the end of the spring being suitably supported on the valve stem as at 50. Valve stem 48 and diaphragm rod 43 are arranged in alignment; and, when the pilot valve is actuated to connect the diaphragm chamber to the vacuum source, the diaphragm is moved upwardly causing the valve stem to be moved upwardly against the tension of the spring 49 to close the valves 47 and disconnect the main vacuum line 17—21 of the receiver from the vacuum pump. At the same time a valve 51 in valve casing 20 is raised from its seat 52 to connect the line 17—21 to atmosphere.

The means for actuating the pilot valve consists of a target 53 arranged in the receiver near the top. The target preferably consists of a sphere having a conical shield 54 attached to it at approximately the point of its maximum circumference and extending upwardly for some distance. This prevents the accumulation of foreign matter which might attach itself to a spherical member. The target is carried by a rod 55 which extends upwardly through the pipe or tube 31 on the bottom of the pilot valve casing. The upper end of rod 55 is provided with one or more nuts 56 and the bore of pipe 31 is reduced as at 57 (see Figs. 2 and 3) to limit the downward movement of the target. It will thus be seen that as the receiver fills, the material causes upward movement of the target and the rod 55 to move the pilot valve from the position shown in Fig. 2 of the drawings to the position shown in Fig. 3 of the drawings and break the vacuum connection to the receiver. The target, while constructed so that it will float on the material collected in the receiver, is not in fact a float because it does not depend for operation upon its buoyancy, but on the force of the material striking it due to the shape of the outlet end of pipe 14. The material coming into the receiver has a tendency to flow as indicated by the arrows in Figs. 4 and 5 of the drawings.

The means for resetting the pilot valve after the contents of the receiver have been discharged is controlled by the door 28. The lower end 58 of the receiver is machined to present an even surface to a sealing gasket 59 which is mounted on the door 28. The door is self-adjusting and is loosely held in place by a plurality of studs 60 which extend through an arm or lever 61 on the end of which the counter-weight 29 is mounted. When the door is closed by the counter-weight, the lever 61 exerts pressure upon the head of a cap screw 62 which is located in the center of the door. This causes the door to adjust itself prior to the attainment of a vacuum within the receiver. Lever 61 is secured to a bracket member 63 and the bracket member is hinged at 64 to a supporting bracket 65. The supporting bracket is secured to the receiver adjacent its lower end by a U-bolt 66. A rod 67 is pivoted to the bracket 63 at a point 68 and this rod extends upwardly beyond the top of the receiver. The upper end of the rod 67 supports a hinged arm 69 which extends across the top of the receiver and at a proper time in the cycle of operation engages the top of the pilot valve member 35. At the beginning of the cycle, the valve member 35 is in the lowered position shown in Figs. 2 and 5 of the drawings and is spaced from the hinged arm 69. As the valve is raised by the target, it contacts the lower side of the hinged arm 69 as shown in Fig. 4 of the drawings. At this time the rod 67 and the arm 69 are in the position shown in Fig. 1, but when the door opens and the lower end of rod 67 moves around the pivot 64 to the position shown in Fig. 6 of the drawing, the rod 67 is lowered and this permits the arm 69 to move downwardly and force the valve member 35 downwardly to its normal filling position shown in Fig. 2 of the drawings.

In Fig. 7 of the drawings I have illustrated an auxiliary valve mechanism which may be connected at any point in the collecting pipes 1, 2 or 3 to take care of abnormal conditions which might arise. This valve consists of a diaphragm chamber 70 having a diaphragm 71 mounted therein. The diaphragm chamber is connected by a pipe 72 to the receiver and is at all times under the same pressure as the receiver. The diaphragm rod 73 extends from the bottom of the casing and is counter-balanced by a weight 74 mounted on a rod 75. The rod 75 is pivoted at 76 on one of the supporting arms 77 of the diaphragm casing and is connected to the diaphragm rod by a pin 78. The lower ends of rods 77 support a plate 79 on which a dash pot 80 is mounted. The diaphragm rod 73 extends into the dash pot casing and is provided with a piston 81 arranged in the cylindrical portion 82 of the dash pot. A passage 83 extends from the top of the dash pot casing to the bottom and the flow of liquid is controlled by the setting of a valve 84 arranged in the by-pass opening 85 at the bottom of the dash pot casing. The downward travel of the piston is accelerated by a check valve 86. A valve casing 87 is supported on the plate 79 having a valve 88 therein which is normally moved upward to a closed position by a spring 89. One side of the valve casing is open to the atmosphere as at 90 and the other side is connected to the collecting pipe 1, 2 or 3 by a pipe 91.

The operation of the auxiliary valve is as follows: When a high vacuum exists in the receiver 13 for an abnormal length of time, the diaphragm 71 is subject to the same degree of vacuum. At a certain degree of vacuum, sufficient force is exerted on this diaphragm to raise the diaphragm rod 73, the piston 71 and weight 74. This causes the lever 75 to move on its pivot into engagement with stem 92 of valve 88. By proper adjustment of the valve 84, the opening of valve 88 may be timed and at the expiration of this period of time, atmospheric pressure will be admitted to the collecting pipe at the desired point. Thus, the establishment of atmospheric pressure in the line breaks the vacuum and permits clearing of the line under such abnormal conditions. Any number of these valves may be installed at different points and so regulated that the line may be automatically cleared should it become filled due to abnormal conditions.

Figs. 8, 9 and 10 illustrate a modified form of pilot valve. This valve is designed to delay restoration of the vacuum within the receiver until all of the material within it has been discharged and the door is about to close. The valve casing 93 is provided with ports 32, 33 and 38, similar to the construction of the pilot valve shown in Fig. 2 of the drawings, but in place of the port 37 by means of which the diaphragm casing 26 is connected to atmosphere during the normal filling operation, the valve member 94 is provided with a central bore 95 which is reduced in diameter adjacent its lower end to provide a valve seat 96. Beyond the valve seat the central bore connects to a transverse passage 97 which communicates with the port 32 by means of a reduced portion 98 of the valve body. A valve member 99 is arranged in the bore of the valve and is adapted to engage the valve seat 96. A bracket 100 is connected to the valve member and extends over the arm 69, the bracket being provided with an adjustable screw 101 which engages this arm. The position of the pilot valve shown in Fig. 8 of the drawings corresponds to the position of the pilot valve shown in Fig. 2 of the drawings, the port 32 being connected to atmosphere through the central bore of the valve member and the valve member as a whole being in lowered position. The port 32 is at the same time disconnected from the port 33. Upon filling of the tank, the target, through the rod 55, moves the valve member 94 upwardly to the position shown in Fig. 10 of the drawings into engagement with the arm 69. At the end of the discharge operation, the valve member 94 is moved downwardly but on its upward movement, the valve 99 has moved downwardly with respect to the valve member to close the connection to the atmosphere (see Fig. 9). Thus the vacuum is held until the door closes and raises the arm 69 to engage the screw 101 and lift the bracket 100. This lifts the valve 99 from its seat and connects the port 32 to atmosphere.

The operation of the device will be apparent from the foregoing description. With the pilot valve in the position shown in Fig. 2 of the drawings, the diaphragm chamber 26 is connected to atmosphere through pipe 27, ports 32 and 37. The main vacuum valves 47 are thus retained in open position by the spring 49 and a vacuum is produced in the line from the pump 22 through the auxiliary separator 18 and the pipe 17. Material is drawn from the troughs 4 into the branch pipes 2 and 3 to the main collecting pipe and delivered into the receiver 13. The door 28 at the discharge end of the receiver is maintained in closed position by counter-weight 29.

As the receiver is filled, the material initially flows straight downwardly toward the bottom of the receiver. As the accumulation of material in the receiver approaches the end of pipe 14, the additional material follows the path indicated by arrows in Figs. 5 and 6, striking the target. The target 53 is thus moved upwardly causing rod 55 to move the valve member 35 from the position shown in Fig. 2 of the drawings to the position shown in Fig. 3 of the drawings. This disconnects the diaphragm chamber 26 from the atmosphere and connects it to the vacuum source through pipe 24, ports 32 and 33 and pipe 27. The diaphragm thus moves upwardly and moves the valves 47 against the tension of the spring 49 to close them and disconnect the line from the vacuum pump. The valves 47 in turn move the valve 51 to open position to connect the top of the receiver to atmosphere. This permits the weight of the material to open the door against the force of the counter-weight 29.

Opening of the door causes the rod 67 to move downwardly away from the end of the hinged arm 69 and the hinged arm, of its own weight, restores the valve member 35 to the position shown in Fig. 2 of the drawings to begin another filling operation. Employing the pilot valve shown in Figs. 8 to 10 of the drawings, the operation is essentially the same except that the connection to atmosphere is delayed to assure that all the material has been discharged from the receiving tank.

The auxiliary valve shown in Fig. 7 of the drawings is for the purpose of meeting abnormal conditions. In conveying granular or liquid material, a more or less continuous flow would normally result but in conveying semi-solid material, such as fleshings and trimmings, there is a tendency to accumulate slugs. If the material in pipes 1, 2 and 3 is of such quantity and weight that the weight of the material balances the power of the available vacuum, atmospheric air is admitted by valve 88 to a portion of the pipe between the top of the column of material and the trough 4 causing the lower part of the column to flow back into the trough and the upper part to be conveyed to the receiver. As that would cause a lowering of the vacuum in the system, the valve 88 would close, and the cycle of operation would be repeated until the accumulation in the trough 4 is removed.

I claim:

1. A conveying system of the character described comprising a receiver, a collecting pipe to deliver material to the receiver, a vacuum source connected to the receiver, a diaphragm chamber connected to the receiver to maintain the same degree of vacuum in the diaphragm chamber as in the receiver, a diaphragm in said chamber, a counter-weight operatively connected to the diaphragm, a dash pot chamber, a piston mounted in the dash pot, and a valve controlled by movement of the counter-weight and adapted to admit air to the collecting pipe.

2. A conveying system of the character described comprising a receiver, a collecting pipe to deliver material to the receiver, a vacuum source, a connection between the vacuum source and the receiver, a valve in the connection, a diaphragm chamber arranged adjacent the valve, a pilot valve arranged adjacent the receiver, mechanism operable by the presence of a given quantity of material in the receiver to actuate the pilot valve, means controlled by the actuation of the pilot valve to connect the diaphragm chamber to the vacuum source to actuate the first named valve and disconnect the receiver from the vacuum source, means to permit discharging of the contents of the receiver when the receiver is disconnected from the vacuum source, and means actuated thereby to reset the pilot valve.

3. A conveying system of the character described comprising a receiver, a collecting pipe to deliver material to the receiver, a vacuum source, a connection between the vacuum source and the receiver, a valve in the connection, a diaphragm chamber adjacent the valve, a diaphragm in said chamber, a pilot valve arranged adjacent the receiver, a target in the receiver associated with the pilot valve to actuate the pilot valve, said pilot valve when actuated being arranged to connect the diaphragm chamber to the vacuum source to actuate the first named valve and disconnect the receiver from the vacuum source, means to permit discharging of the contents of the receiver when the receiver is disconnected from the vacuum source, and means actuated thereby to reset the pilot valve.

4. A conveying system of the character described comprising a receiver, a collecting pipe to deliver material to the receiver, a vacuum source, a connection between the vacuum source and the receiver, a valve in the connection, a diaphragm chamber adjacent the valve, a diaphragm in said chamber, a pilot valve arranged adjacent the receiver, a target in the receiver associated with the pilot valve to actuate the pilot valve, said pilot valve when actuated being arranged to connect the diaphragm chamber to the vacuum source to actuate the first named valve and disconnect the receiver from the vacuum source, a hinged door at the bottom of the receiver to permit automatic discharge of the contents of the receiver when it is disconnected from the vacuum source, and means actuated by the hinged door to reset the pilot valve.

5. A conveying system of the character described comprising a receiver, a collecting pipe to deliver material to the receiver, a vacuum source, a connection between the vacuum source and the receiver, a valve in the connection, a diaphragm chamber adjacent the valve, a diaphragm in said chamber, a pilot valve arranged adjacent the receiver, a target in the receiver associated with the pilot valve to actuate the pilot valve, said pilot valve when actuated being arranged to connect the diaphragm chamber to the vacuum source to actuate the first named valve and disconnect the receiver from the vacuum source, a hinged door at the bottom of the receiver to permit discharge of material from the receiver when it is disconnected from the vacuum source, and a rod connected to the hinged door to reset the pilot valve.

6. A conveying system of the character described comprising a receiver, a collecting pipe to deliver material to the receiver, a vacuum source, a connection between the vacuum source and the receiver, a valve in said connection, a diaphragm chamber adjacent the valve, a diaphragm in said chamber, a pilot valve arranged adjacent the receiver, the pilot valve being provided with a port connected to the diaphragm chamber and being provided with two other ports adapted to connect the diaphragm chamber to the vacuum source or to the atmosphere, means controlled by the accumulation of material in the receiver to actuate the pilot valve and disconnect the diaphragm chamber from the atmosphere and connect it to the vacuum source, means actuated by the diaphragm for operating said first named valve to disconnect the receiver from the vacuum source, means to permit discharging of the contents of the receiver when the receiver is disconnected from the vacuum source, and means actuated thereby to reset the pilot valve.

7. A conveying system of the character described comprising a receiver, a collecting pipe to deliver material to the receiver, a vacuum source, a connection between the vacuum source and the receiver, a valve in said connection, a diaphragm chamber adjacent the valve, a diaphragm in said chamber, a pilot valve arranged adjacent the receiver, the pilot valve being provided with a port connected to the diaphragm chamber and being provided with two other ports adapted to connect the diaphragm chamber to the vacuum source or to the atmosphere, a target in the receiver actuated by accumulation of material therein to actuate the pilot valve and connect the diaphragm chamber to the vacuum source, means actuated by the diaphragm to operate the first named valve and disconnect the receiver from the vacuum source, means to permit discharging of the contents of the receiver when the receiver is disconnected from the vacuum source, and means actuated thereby to reset the pilot valve.

8. A conveying system of the character described comprising a receiver, a collecting pipe to deliver material to the receiver, a vacuum source, a connection between the vacuum source and the receiver, a valve in said connection, a diaphragm chamber adjacent the valve, a diaphragm in said chamber, a pilot valve arranged adjacent the receiver, the pilot valve being provided with a port connected to the diaphragm chamber and being provided with two other ports adapted to connect the diaphragm chamber to the vacuum source or to the atmosphere, a target in the receiver actuated by accumulation of material therein to actuate the pilot valve and connect the diaphragm chamber to the vacuum source, means actuated by the diaphragm to operate the first named valve and disconnect the receiver from the vacuum source, means to permit discharge of the contents of the receiver when it is disconnected from the vacuum source and means actuated thereby for resetting the pilot valve to disconnect the diaphragm chamber from the vacuum source and connect it to atmosphere.

9. A conveying system of the character described comprising a receiver, a collecting pipe to deliver material to the receiver, a vacuum source, a connection between the vacuum source and the receiver, a valve in the connection, a pilot valve arranged adjacent the receiver, mechanism operable by the presence of a given quantity of material in the receiver to actuate the pilot valve, means controlled by the actuation of the pilot valve to actuate the first valve and disconnect the receiver from the vacuum source, means to permit discharge of the contents of the receiver when the receiver is disconnected from the vacuum source, and means actuated thereby for resetting the pilot valve.

10. A conveying system of the character described comprising a receiver, a collecting pipe to deliver material to the receiver, a vacuum source, a connection between the vacuum source and the receiver, a valve in the connection, a pilot valve arranged adjacent the receiver, a target in the receiver associated with the pilot valve to actuate the pilot valve, means controlled by the actuation of the pilot valve to actuate the first valve and disconnect the receiver from the vacuum source, means to permit discharge of the contents of the receiver when the receiver is disconnected from the vacuum source, and means actuated thereby for resetting the pilot valve.

GOVE SAYLOR BOYLAN.

REFERENCES CITED

The following references are of record in the file of this patent:

UNITED STATES PATENTS

| Number | Name | Date |
| --- | --- | --- |
| 219,019 | Renard | Aug. 26, 1879 |
| 1,887,733 | Sablik | Nov. 15, 1932 |
| 1,896,597 | Smith | Feb. 7, 1933 |
| 1,901,791 | Woodeson | Mar. 14, 1933 |
| 1,901,932 | Schaub | Mar. 21, 1933 |
| 2,027,697 | Nielsen | Jan. 14, 1936 |
| 2,035,410 | Smith | Mar. 24, 1936 |
| 2,096,595 | Sanford | Oct. 19, 1937 |
| 2,149,056 | Klux | Feb. 28, 1939 |
| 2,190,726 | McKenna | Feb. 20, 1940 |
| 2,221,741 | Vogel-Jorgensen | Nov. 12, 1940 |
| 2,276,805 | Tolman | Mar. 17, 1942 |
| 2,308,365 | Hornbrook | Jan. 12, 1943 |

FOREIGN PATENTS

| Number | Country | Date |
| --- | --- | --- |
| 21,550 | Great Britain | 1914 |